(12) United States Patent
Kwoczek et al.

(10) Patent No.: US 10,779,239 B2
(45) Date of Patent: Sep. 15, 2020

(54) METHOD FOR OPERATING A MOBILE RADIO STATION, MOBILE RADIO STATION, AND COMPUTER PROGRAM

(71) Applicant: VOLKSWAGEN AKTIENGESELLSCHAFT, Wolfsburg (DE)

(72) Inventors: Andreas Kwoczek, Lehre (DE); Teodor Buburuzan, Braunschweig (DE); Roman Alieiev, Stendal (DE); Thorsten Hehn, Etting (DE); Ernst Zielinski, Bochum (DE); Steffen Schmitz, Wesel (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 16/049,869

(22) Filed: Jul. 31, 2018

(65) Prior Publication Data

US 2019/0037500 A1 Jan. 31, 2019

(30) Foreign Application Priority Data

Jul. 31, 2017 (DE) .................. 10 2017 213 166

(51) Int. Cl.
*H04W 52/02* (2009.01)
*G07C 5/08* (2006.01)
(Continued)

(52) U.S. Cl.
CPC ........ *H04W 52/0251* (2013.01); *G07C 5/008* (2013.01); *G07C 5/08* (2013.01);
(Continued)

(58) Field of Classification Search
CPC ..... H04L 47/10; H04L 47/22; H04L 47/2441; H04L 12/5602; H04L 2012/568;
(Continued)

(56) References Cited

U.S. PATENT DOCUMENTS 8,831,224 B2 9/2014 Bai et al.
9,141,112 B1 * 9/2015 Loo .................. G05D 1/0293
(Continued)

FOREIGN PATENT DOCUMENTS

DE 10148010 A1 4/2003
DE 102014115160 A1 4/2016
(Continued)

OTHER PUBLICATIONS

Search Report for European Patent Application No. 18183203.1; dated Dec. 3, 2018.
(Continued)

*Primary Examiner* — Brenda H Pham
(74) *Attorney, Agent, or Firm* — Barnes & Thornburg, LLP

(57) ABSTRACT

A method, mobile radio station and computer program to perform a change of the mobile radio device category based on the state of the transportation vehicle. When the transportation vehicle is stopped, a lower mobile radio device category is selected, wherein the downlink and/or uplink data rates are reduced. This protects the battery of the transportation vehicle and improves the resource utilization in the mobile radio system.

23 Claims, 5 Drawing Sheets

(51) Int. Cl.
*H04W 76/20* (2018.01)
*H04W 4/44* (2018.01)
*H04W 4/50* (2018.01)
*H04W 88/02* (2009.01)
*G07C 5/00* (2006.01)
*H04W 76/27* (2018.01)
*H04W 4/70* (2018.01)
*H04W 84/00* (2009.01)
*H04W 88/04* (2009.01)

(52) U.S. Cl.
CPC ............ *G07C 5/0841* (2013.01); *H04W 4/44* (2018.02); *H04W 4/50* (2018.02); *H04W 52/02* (2013.01); *H04W 52/0254* (2013.01); *H04W 52/0261* (2013.01); *H04W 76/20* (2018.02); *H04W 76/27* (2018.02); *H04W 88/02* (2013.01); *H04W 88/023* (2013.01); *H04W 4/70* (2018.02); *H04W 84/005* (2013.01); *H04W 88/04* (2013.01)

(58) Field of Classification Search
CPC . H04L 47/50; H04L 2012/5608; H04L 45/02; H04L 45/04; H04L 45/10; H04W 84/12; H04W 88/08; H04W 80/04; H04W 88/06; H04W 84/18; H04W 74/08; H04W 8/26
USPC ................. 370/310.2, 328, 338, 349, 400
See application file for complete search history.

(56) References Cited

U.S. PATENT DOCUMENTS

| | | | |
|---|---|---|---|
| 2003/0233254 | A1* | 12/2003 | Hamilton ............ G06F 19/328 705/2 |
| 2008/0095134 | A1* | 4/2008 | Chen .................... H04B 7/2606 370/342 |
| 2011/0263293 | A1 | 10/2011 | Blake et al. |
| 2012/0275369 | A1 | 11/2012 | Zhang et al. |
| 2015/0372801 | A1 | 12/2015 | Smee et al. |
| 2016/0316358 | A1 | 10/2016 | Orr et al. |
| 2017/0142204 | A1 | 5/2017 | Kodaypak et al. |
| 2017/0196016 | A1 | 7/2017 | Tabet et al. |

FOREIGN PATENT DOCUMENTS

| | | |
|---|---|---|
| DE | 102016212002 A1 | 9/2017 |
| EP | 3010213 A1 | 4/2016 |
| RU | 2007122389 A | 12/2008 |
| WO | 2007129357 A1 | 11/2007 |

OTHER PUBLICATIONS

LTE Release Versions and Device Categories; downloaded from http://www.lte-anbieter.info/technik/kategorien-und-3gpp-release.php; 2013.

* cited by examiner

METHOD FOR OPERATING A MOBILE
RADIO STATION, MOBILE RADIO STATION,
AND COMPUTER PROGRAM

PRIORITY CLAIM

This patent application claims priority to German Patent Application No. 10 2017 213 166.7, filed 31 Jul. 2017, the disclosure of which is incorporated herein by reference in its entirety.

SUMMARY

Illustrative embodiments relate to a method for operating a mobile radio station, which is a subscriber of a mobile radio communication system. Illustrative embodiments also relate to a mobile radio station for implementing the method and to a computer program for implementing the method.

BRIEF DESCRIPTION OF THE DRAWINGS

An exemplary embodiment is shown in the drawings and is explained in more detail by reference to the figures. Shown are.

DETAILED DESCRIPTION

Figure 1:
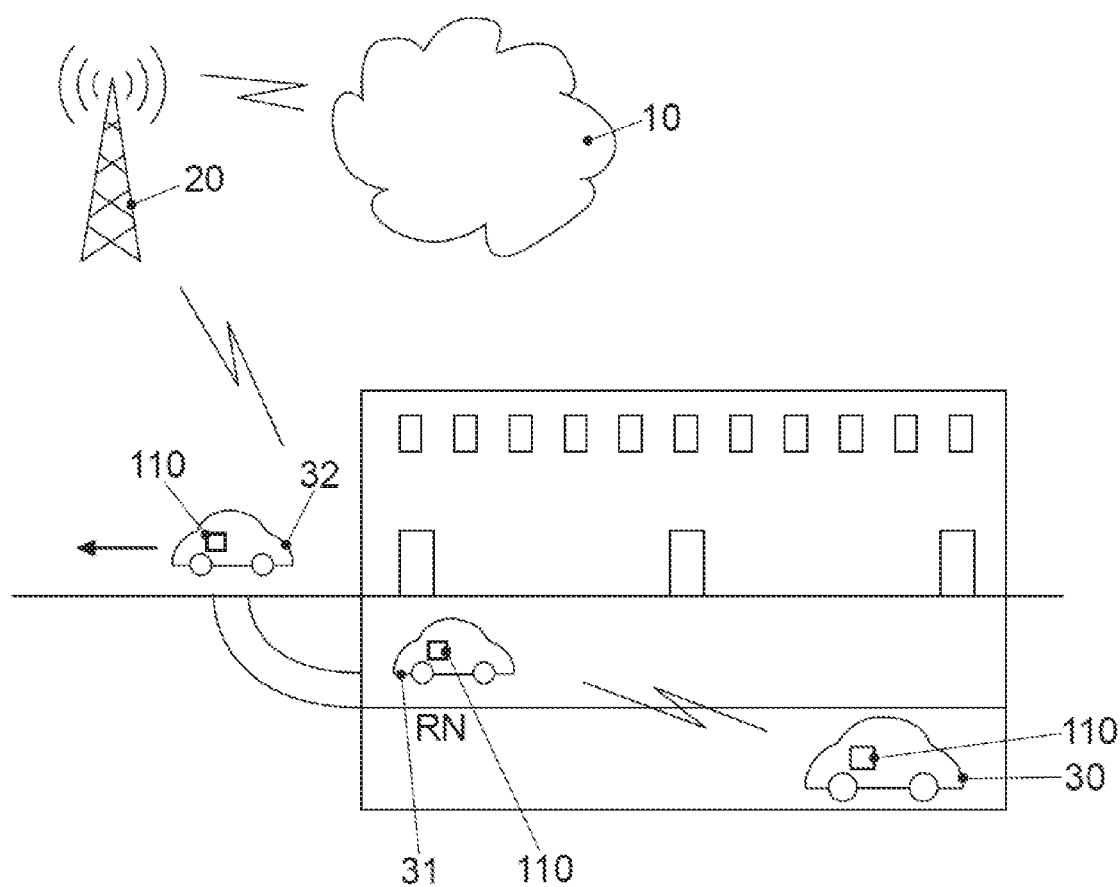
FIG. 1 shows an underground parking garage scenario in which two transportation vehicles are parked in the underground garage and a transportation vehicle is moving on the access road to the underground garage.

The basis of the disclosure is the scenario of transportation vehicles equipped with radio communication modules, which also communicate as subscribers in the public mobile radio network. Today's public mobile radio networks are mainly designed in one of the different variations of the 3GPP standard family of the LTE system, which stands for Long Term Evolution.

In the future, more and more transportation vehicles will be equipped with radio communication modules, which are able to communicate via WLAN or via the mobile radio network. For the scenario of transportation vehicles equipped with radio communication modules, which directly communicate with each other in the public road system, whether it be for cooperative or autonomous driving, it is essential to be equipped with a wireless communication module.

A radio communication module in the field of automotive technology is often also designated as an on-board unit OBU, online connectivity unit OCU, or a wireless modem. These terms are treated here as synonyms.

The task of the radio communication module in the field of mobile radio is to guarantee a secure and stable connection between the transportation vehicle and the backend of the mobile radio network. Currently, the following mobile technologies are used: GSM, 3GPP-based UMTS, HSPA and LTE.

This therefore involves a separate radio modem, with one or more mobile radio antennas, which enables the mobile radio reception and also a more stable and faster internet connection. This may include the transportation vehicle being equipped with an interface for reading a SIM card. This can be positioned in the glove compartment of the transportation vehicle.

As in the case of smartphones, the quality of the radio connection/internet connection, and therefore the transmission speed, in the transportation vehicle's built-in mobile radio communication modules will also vary depending on the location. The mobile radio coverage can sometimes differ considerably depending on the region and the mobile radio service provider. In addition, in underground garages or tunnels, sometimes only an inferior quality connection is possible, or even none at all.

In mobile radio the reliability of the data transmission means completeness (all user data sent arrive at the receiver) and correctness (the transmitted user data and the user data recovered from the received data match). To achieve this, various methods are used in mobile radio technologies, e.g., frequency diversity, spatial diversity, sensible choice of the modulation type and modulation parameters and of the channel code to be used, as well as the code rate, etc.!

The LTE system even supports the transportation vehicle direct communication protocol. In this system the road users communicate with each other directly, without the communication being routed via a mobile radio base station. In the case of LTE this option is known under the heading LTE-V, in the non-vehicle-based communication this option is called device-to-device communication (D2D).

Typical communication scenarios for transportation vehicle direct communication are safety scenarios, traffic efficiency scenarios and infotainment. In terms of safety, the following scenarios are given: "Cooperative forward collision warning", "Pre-crash sensing/warning", "Hazardous location warning". In these areas the transportation vehicles exchange information such as position, direction and speed with one another, but also parameters such as size and weight. Additional types of information that are transmitted relate to information on intentions, such as "transportation vehicle intends to overtake", "transportation vehicle is turning left/right" etc., which are of interest for cooperative driving. This often involves sensor data being transmitted. If a hazardous situation exists and the driver does not react, the car could automatically brake so that an accident is prevented, or at least the consequences in the case of an unavoidable accident are kept to a minimum. In the area of "Platooning", which involves cooperative driving in a convoy, it is planned to signal, e.g., information about the planned braking behavior from front to rear to prevent rear-end collisions.

In this case the hardware and software equipment for radio communication modules used in the transportation vehicle largely corresponds to that of a modern smartphone, disregarding the display. Therefore, such high-quality radio communication modules are currently mainly found in the premium segment of transportation vehicle categories.

Due to the worldwide distribution of 3GPP-based mobile radio networks, the communication devices installed in transportation vehicles for mobile radio communication also conform to these specifications.

The functionality of a mobile radio device is determined, among other things, by the so-called mobile radio device category, which is communicated with every registration on the mobile radio network.

The 3GPP standard specifies many different mobile radio device categories. A good overview of the various mobile radio device categories can be found in the internet publication "LTE release versions and device categories" under the following link:

http://www.lte-anbieter.info/technik/kategorien-und-3gpp-release.php

Although over 12 different mobile radio device categories have already been specified, it remains a matter for the manufacturer to select a desired mobile radio device category and then to develop and produce a mobile radio device according to this category. The mobile radio device category is therefore already defined at the development stage and remains fixed during the lifetime of the mobile radio device. Registration on the mobile radio network, therefore, is always performed with the same mobile radio device category.

From document US 2016/316358 A1 a UE device is known, which has the capability to change the device category. In this case, the change of the device category is effected either by a service provider, or else the device executes the change automatically or an operator effects the change manually.

Document US 2017/0196016 A1 also relates to mobile radio base stations (UE devices), which can implement a change of device category. It is described there that a change of the device category can take place if the QoS criteria can no longer be complied with.

Document US 2015/0372801 A1 describes a UE device, which can also work as a radio relay.

Document US 2012/275369 A1 also describes UE devices. These are specially configured to enable the simultaneous support of different transmission modes, namely unicast and multicast/broadcast.

In future generations of transportation vehicles, communication modules will be used that offer more features than previous generations of communication devices. Different transportation vehicle states may require a different functionality in the devices. Examples of different transportation vehicle states are a parked or a moving transportation vehicle. A parked transportation vehicle provides only a limited energy budget for control devices and at the same time does not need a high-quality data connection in this state. The requirements of machine-to-machine communication are more appropriate in this case. If the transportation vehicle provides communications services to the occupants of the transportation vehicle, as is usually the case with a transportation vehicle that has been started, then a high data rate is required. It has been recognized in the context of the disclosure that the current approach: the definition of the mobile radio device category at the development stage and use of this fixed mobile radio device category over the lifetime of the device, represents a problem, at least from the point of view of a transportation vehicle manufacturer. This is because there is currently no known mechanism that allows the devices to make a change in the mobile radio device category based on operating states. Disclosed embodiments provide a method with which it is possible to implement a change in the mobile radio device category depending on the operating state.

Disclosed embodiments provide a method for operating a mobile radio station, a mobile radio station, and a computer program.

If the transportation vehicle is in a state where the transportation vehicle is parked and the machine is switched off, then it is provided here that the communication module is registered on the mobile radio network with a mobile radio device category for a machine-to-machine communication. The communication with the mobile radio network therefore takes place with a low data rate, thereby reducing the energy consumption of the communication device. Due to the low energy consumption the device can be connected to the network for longer before the transportation vehicle battery is exhausted.

If the state of the transportation vehicle changes into state 2 (the engine of the transportation vehicle is started, for example), then the communication device registers on the network with the device category "machine-to-machine" and thereafter registers with a device category for devices with higher data rates. This allows, for example, transportation vehicle occupants to be supplied with multimedia content or the transportation vehicle can be supplied with map data for an upcoming trip.

The proposal relates to a method for operating a mobile radio station, wherein in the mobile radio system a number of mobile radio device categories are defined, and the communication in the mobile radio system requires a log-in/registration on a mobile radio network specifying the mobile radio device category of the mobile radio station. In this process, different mobile radio device categories are assigned to a number of different operating states of the mobile radio station, and in the mobile radio station it is monitored whether the operating state changes. Therefore, in operation it is checked whether the registered device category still matches the change in the operating state, wherein if it is determined that another mobile radio device category is provided for the change in the operating state, that the mobile radio station is logged out of the mobile radio base station. This is followed by a re-registration of the mobile radio station specifying the mobile radio device category that is now appropriate.

The disclosed method provides for the quality of service to be adapted very flexibly to different operating states. Thus, important mobile radio resources are not permanently occupied if the operating state does not require it. The efficiency of the mobile radio coverage can thereby be increased. Another benefit is the fact that the existing mechanisms, such as the registering and de-registration of communication devices in 3GPP-based mobile radio networks, can continue to be used in a simple manner without the need to specify and develop new procedures. The innovation must be implemented primarily on the side of the communication device.

Compared with an alternative solution, in which a new mobile radio device category would have to be specified for which a change of service would be provided according to operating states, there is an benefit in the fact that the 3GPP mobile radio specifications do not need to be supplemented by another device category.

For the implementation it is beneficial if the respective operating state is registered in a register location in a registration area of a memory and the entry in the register location is updated upon detection of the change of the operating state.

Here, it is also beneficial if the check as to whether the registered mobile radio device category still matches the change of operating state is carried out upon detection of the change of operating state. This would correspond to an implementation using an interrupt service routine.

In accordance with another alternative design, the check as to whether the registered device category still matches the change of the operating state is carried out continuously in operation or repeated intermittently or repeated with a specific time interval.

For the technical programming implementation, it is beneficial if the current mobile radio device category is registered in another register location of the registration area and the entry in this other register location is updated during the process of de- and re-registration of the mobile radio station on the mobile radio base station. The method is therefore deterministic and no confusions occur if the operating state changes again after a short time.

For a specific implementation in a mobile radio device, such as a smartphone or tablet, it is beneficial if at least the operating states "Power On" and "Standby" are distinguished for the registration, wherein a variation of the mobile radio standard family LTE, corresponding to Long Term Evolution, is used as the mobile radio system, and a mobile radio device category of "Category 6" or above, corresponding to "mobile broad band (MBB)", is provided for the "Power On" operating state and a mobile radio device category of lower than "Category 6" or a device category for MTC (Machine Type Communication) and/or NB-IoT (Narrow band Internet of things) is provided for the operating state "Standby".

The disclosed embodiments can be used in a transportation vehicle. In this case, it is provided that the operating state relates to the operating state of the transportation vehicle.

Here, it is beneficial if at least the operating states "Engine On" and "Engine Off" are distinguished for the registration.

For the use of the disclosed embodiments in a transportation vehicle, a special benefit is obtained that due to the change into another mobile radio device category, in particular, in stationary periods when the transportation vehicle is parked ("Engine Off"), the battery of the transportation vehicle can be conserved. Due to the transportation vehicle-state dependent use of device categories, existing functions in the transportation vehicle can be improved, and new functions also introduced. Functional improvements can be, for example, a longer online time of the communication device, since the use of a machine-to-machine device category means that less energy is consumed.

As a further operating state, which may be provided for the registration in the case of transportation vehicles, at least the operating state in which the parked transportation vehicle is operated as a radio relay station can be distinguished.

For a specific implementation, a variation of the mobile radio standard family LTE, corresponding to Long Term Evolution, is again used as the mobile radio system, and the mobile radio device category "Category M1" corresponding to "machine type communication MTC" is provided for the "Engine Off" operating state and a mobile radio device category of "Category 6" or above, corresponding to "mobile broad band MBB", is provided for the operating states "Engine On" and "Relay".

For the technical programming implementation, it is again beneficial if an assignment table is provided in a memory, from which the assignment of one or more operating states to a mobile radio device category is extracted. This can be implemented as a lookup table.

For a mobile radio station in accordance with the proposal it is beneficial that the mobile radio station has a memory, or that a memory is assigned to the mobile radio station, in which the assignment of one or more operating states to a mobile radio device category is stored in a table.

Further beneficial measures consist in the fact that the memory has a register location in a registration area of the memory, in which the respective operating state is registered, and the memory has another register location in the registration area in which the current mobile radio device category is registered.

Such a mobile radio station can be integrated in a transportation vehicle as a communication module.

For the disclosed computer program, the corresponding benefits apply as in the case of the disclosed method.

The following description illustrates the principles of the disclosure. It goes without saying, therefore, that persons skilled in the art will be in a position to design different arrangements which, although not explicitly described here, nevertheless embody the principles of the disclosure and are also intended to fall within its scope of protection.

FIG. 1 shows a typical underground parking garage scenario in mobile communication. There are three transportation vehicles shown. The transportation vehicle 30 is parked in the rear part of the underground garage. The transportation vehicle 31 is parked in the front part of the underground garage. Another transportation vehicle 32 is then shown, which is moving on the access road to the underground garage. The transportation vehicles are each equipped with a communication module 110, which is also known as an on-board unit or online connectivity unit. The communication module 110 acts as the transmitting and receiving unit for the mobile communication. All the messages from the transportation vehicles (uplink) and to the transportation vehicles (downlink) can be routed either via a base station 20, which operates a mobile radio cell, or in the case of transportation vehicle direct communication (sidelink) are exchanged directly between the transportation vehicles 30, 31, 32. If the transportation vehicles are located within this mobile radio cell, they are logged-in or registered on the base station 20. If they leave the mobile radio cell, they are transferred to the adjacent cell (handover) and accordingly logged out or de-registered from the base station 20. The base station 20 also provides an access to the internet 10 available, so that the transportation vehicles 30, 31, 32 or all other mobile radio subscribers in the mobile radio cell are supplied with internet data.

These techniques are standardized and reference is made in this connection to the relevant specifications of mobile radio standards. As a modern example of a mobile radio standard, reference is made to the 3GPP initiative and the LTE standard (Long Term Evolution). Many of the associated ETSI specifications are currently available in version 13. An example is the following: ETSI TS 136 213 V13.0.0 (2016-05); Evolved Universal Terrestrial Radio Access (E-UTRA); Physical layer procedures (3GPP TS 36.213 version 13.0.0 Release 13). The version referred to here is the ETSI specification valid for Europe. Corresponding specifications for other regions of the world are published by other standardization organizations.

The problematic properties of the underground garage scenario under consideration is now that in an underground parking garage there is often no network coverage available. As is well known, the radio waves have poor penetration through concrete walls, so that a mobile radio subscriber who is located in the rear part or lower part of an underground garage cannot receive a mobile radio signal. The transportation vehicle 30, which is parked in the rear part of the underground garage, is affected by this. This transportation vehicle has either no connection or only a poor connection to the base station 20 because of poor network coverage in the rear/lower part of the underground garage. While it would be possible to completely switch off the communication module 110 while the transportation vehicle 30 is parked, for various functions it can be beneficial if the communication module maintains a connection to the mobile radio network. Relevant examples are the car telephone function for handling incoming calls, the navigation function to perform a map update in the background or to receive current traffic information, or the rest of the infotainment area, for example, to provide certain services with data such as news services, social media services, etc. Advanced transportation vehicle convenience functions, such as remote unlocking, implemented via the mobile radio network, and queries of transportation vehicle parameters such as fuel tank or battery level via the mobile radio network are also conceivable.

In the front section of the underground car park, near the exit or entrance lane or else in the vicinity of lighting or supply shafts, the network coverage is often better. The transportation vehicle 31 is parked there. The on-board unit 110 of this transportation vehicle is configured as a relay radio station (relay node) RN. This transportation vehicle 31 is therefore being used to ensure the mobile radio coverage in the rear/lower part of the underground garage. On the one hand, the relay radio station maintains the radio link to the base station 20. On the other hand, the other transportation vehicles in the rear/lower part of the underground garage are registered on the relay radio station RN. For this purpose, the relay radio station forwards their messages to the base station 20. Conversely, in the downlink transmission direction, the messages that are sent from the base station 20 to the subscribers UE are received by the relay radio station RN and forwarded to the subscribers UE. Thus, those transportation vehicles that cannot set up a direct radio link to the base station 20 can also be supplied with mobile communications.

Further details on the selection and configuration of a transportation vehicle that is configured as a relay radio station RN can be obtained from the earlier patent application with the application number DE 10 2006 212 002.6.

Figure 2:
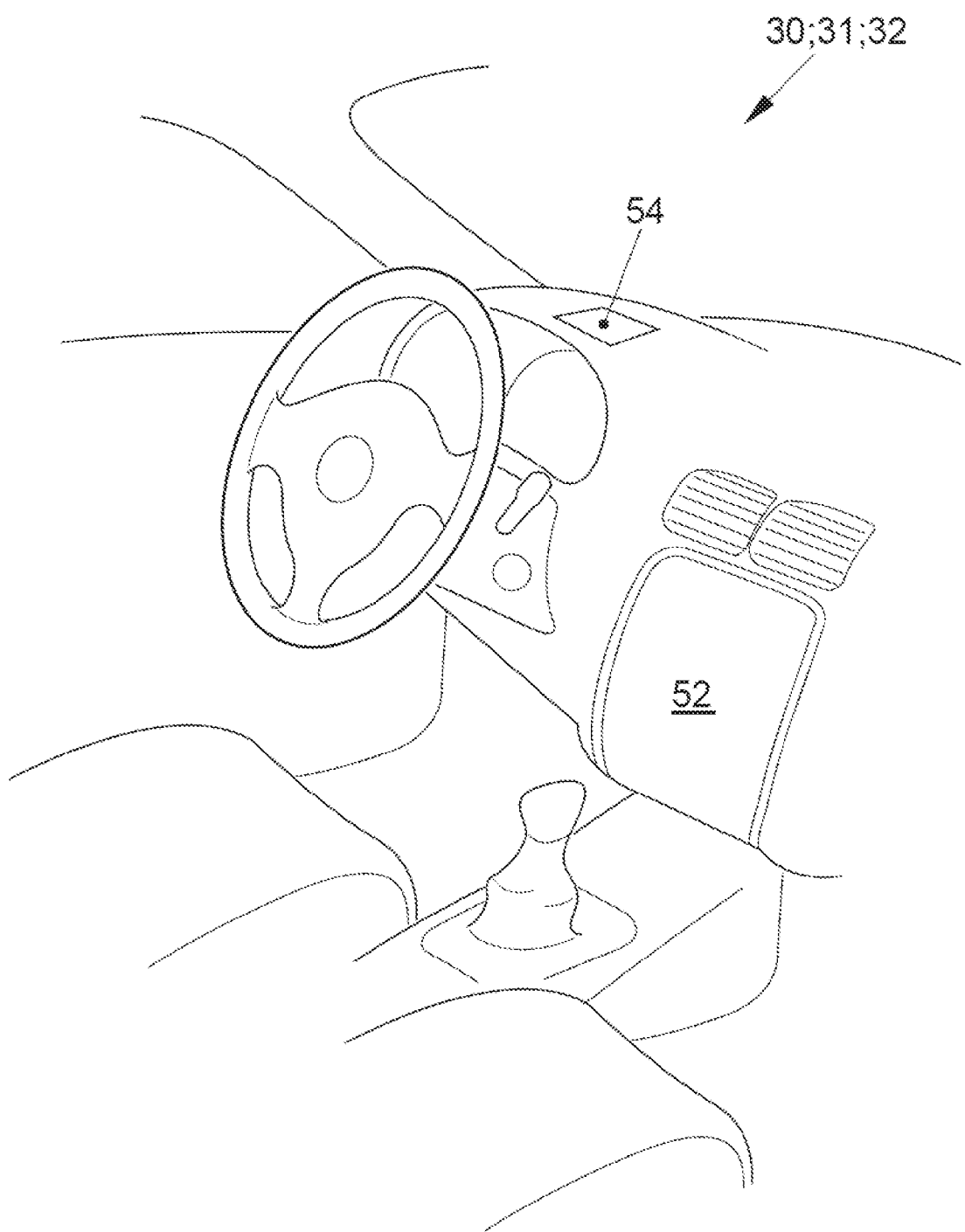
FIG. 2 shows a cockpit of a transportation vehicle.

FIG. 2 shows the cockpit of one of the transportation vehicles 30, 31, 32. The transportation vehicle shown here is a passenger car. Any other type of transportation vehicle could also be considered as the transportation vehicle, however. Examples of other transportation vehicles are: buses, commercial transportation vehicles, in particular, lorries, agricultural machinery, construction transportation vehicles, motorcycles, rail transportation vehicles, etc. The use of the disclosed embodiments would be possible in land transportation vehicles, rail transportation vehicles, water-borne transportation vehicles and aircraft.

Three display units of an infotainment system are shown in the cockpit. These are the head-up display 54 and a touch-sensitive screen 52, which is mounted in the central console. When driving, the central console is not in the driver's field of vision. Therefore, the additional information is not overlaid on the display unit 52 when driving.

The touch-sensitive screen 52 is used to operate functions of the transportation vehicle 30, 31, 32. For example, it could be used to control a radio, a navigation system, a playback of stored music tracks and/or an air-conditioning system, or other electronic devices or other convenience functions or applications of the transportation vehicle 30, 31, 32. Collectively, this is often referred to as an "infotainment system". An infotainment system in transportation vehicles, in particular, cars, designates the combination of a car radio, navigation system, speakerphone device, driver assistance systems and other functions in a central control unit. The term infotainment is a portmanteau word composed of the words information and entertainment.

The infotainment system is operated mainly using the touch-sensitive screen 52 (touch screen), wherein this screen 52 can be easily viewed and operated by a driver of the transportation vehicle 30, 31, 32, but also by a passenger of the transportation vehicle. Below the screen 52, mechanical controls such as buttons, rotary knobs or combinations thereof, such as rotary pressure knobs, can also be arranged.

Figure 3:
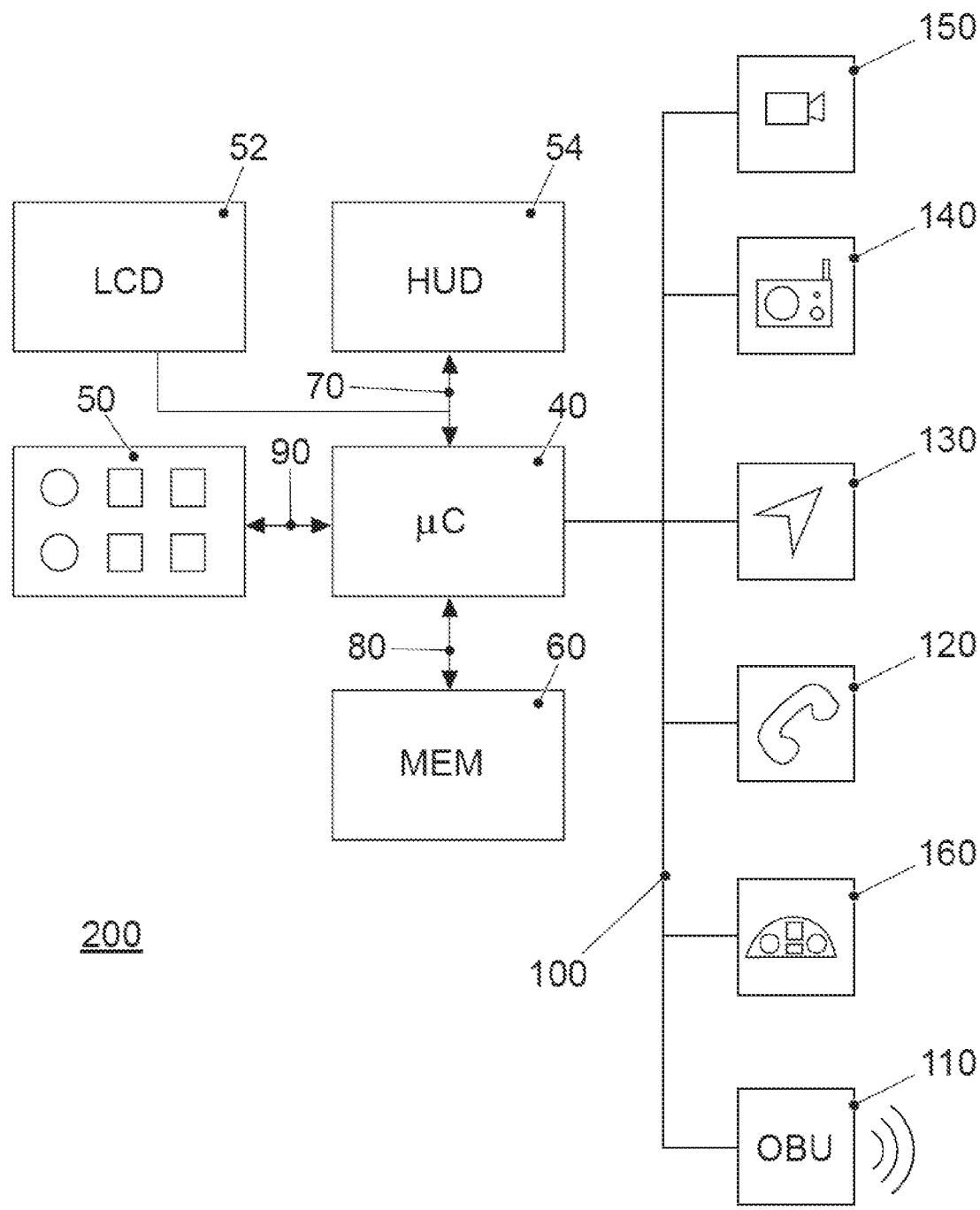
FIG. 3 shows a block diagram for the infotainment electronics of a transportation vehicle.

FIG. 3 shows a schematic block wiring diagram of the infotainment system 200 and some examples of sub-systems or applications of the infotainment system. The control device comprises the touch-sensitive screen 52, a processing device 40, an input unit 50 and a memory 60. The screen 52 comprises both a display area for displaying variable graphical information as well as a control surface (touch-sensitive layer) positioned above the display area for entering commands by a user.

The screen 52 is connected to the processing device 40 via a data cable 70. The data cable can be based on the prior art, e.g., LVDS (Low Voltage Differential Signaling), TMDS (Transition Minimized Differential Signaling). Via the data line 70 the screen 52 receives control data for controlling the display area of the touch screen 52 from the processing device 40. Via the data line 70, control data from the input commands are also transmitted from the touch screen 52 to the processing device 40. The reference number 50 designates an input unit. Associated with this are the above-mentioned mechanical controls such as buttons, rotary knobs, slider controls, or rotary pressure knobs, with which the operator can make entries via the menu navigation. The term entry is understood generally to mean calling up a selected menu option, as well as changing a parameter, switching a function on and off, etc.

The storage device 60 is connected to the processing device 40 via a data cable 80. The memory 60 contains a stored catalog of icons and/or a symbol catalog, with the icons and/or symbols for the possible displays of additional information. Other areas of the memory 60 will be described in greater detail below.

The other parts of the infotainment system, camera 150, radio 140, navigation device 130, telephone 120 and instrument cluster 160 are connected to the device for operating the infotainment system via the data bus 100. The high-speed option of the CAN-bus in accordance with ISO standard 11898-2 is a suitable choice for the data bus 100. Alternatively, the use of a bus system based on Ethernet technology in accordance with IEEE 802.03 is possible. Bus systems in which the data transmission takes place via fiber-optic cables can also be used. Examples to be cited are the MOST bus (Media Oriented System Transport) or the D2B bus (Domestic Digital Bus). It is also noted here that the camera 150 can be designed as a conventional video camera. In this case, it records up to 25 full frames/s, which in the interlace recording mode corresponds to 50 half-frames/s. Alternatively, a special camera can be used which takes more images/s to increase the accuracy of the object detection for faster moving objects. A plurality of cameras can be used for monitoring the surroundings. In addition, the radar or lidar systems already mentioned can be used in addition or as alternatives to carry out or extend the surroundings monitoring. For wireless communication internally and externally the transportation vehicle 30, 31, 32 is equipped with a communication module 110. It can be designed for mobile radio communication, e.g., based on the LTE standard, corresponding to Long Term Evolution. Via the communication module 110, the transportation vehicle 30, 31, 32 can transmit and receive mobile data. It can also be designed for WLAN communication, in accordance with Wireless LAN, either for communication with devices belonging to the occupants of the transportation vehicle or for vehicle-to-vehicle communication, etc.

As described above, for various functions of the transportation vehicle 30 it may be useful that the communication module 110 maintains a connection to the mobile radio network. If the transportation vehicle is parked and the engine is switched off, however, it is necessary that the battery be not too heavily loaded. It is therefore beneficial that a connection is established in which less energy is consumed. Conversely though, this means that the connection then only supports a lower data rate. The 3GPP has specified different mobile radio device categories. In doing so, the different types of devices were specified separately based on downlink and uplink characteristics. The following table shows the different mobile radio device categories for the downlink section. This table was taken from the 3GPP specification 3GPP TS 36.606 V14.0.0 (2016-09).

TABLE 4.1A-1

| | Downlink physical layer parameter values set by the field ue-CategoryDL | | | |
|---|---|---|---|---|
| UE DL Category | Maximum number of DL-SCH transport block bits received within a TTI (Note 1) | Maximum number of bits of a DL-SCH transport block received within a TTI | Total number of soft channel bits | Maximum number of supported layers for spatial multiplexing in DL |
| DL Category M1 | 1000 | 1000 | 25344 | 1 |
| DL Category M2 | 4008 | 4008 | 73152 | 1 |
| DL Category 0 (Note 2) | 1000 | 1000 | 25344 | 1 |
| DL Category 1bis | 10296 | 10296 | 250368 | 1 |
| DL Category 4 | 150752 | 75376 | 1827072 | 2 |
| DL Category 6 | 301504 | 149776 (4 layers, 64QAM) 75376 (2 layers, 64QAM) | 3654144 | 2 or 4 |
| DL Category 7 | 301504 | 149776 (4 layers, 64QAM) 75376 (2 layers, 64QAM) | 3654144 | 2 or 4 |
| DL Category 9 | 452256 | 149776 (4 layers, 64QAM) 75376 (2 layers, 64QAM) | 5481216 | 2 or 4 |
| DL Category 10 | 452256 | 149776 (4 layers, 64QAM) 75376 (2 layers, 64QAM) | 5481216 | 2 or 4 |
| DL Category 11 | 603008 | 149776 (4 layers, 64QAM) 195816 (4 layers, 256QAM) 75376 (2 layers, 64QAM) 97896 (2 layers, 256QAM) | 7308288 | 2 or 4 |
| DL Category 12 | 603008 | 149776 (4 layers, 64QAM) 195816 (4 layers, 256QAM) 75376 (2 layers, 64QAM) 97896 (2 layers, 256QAM) | 7308288 | 2 or 4 |
| DL Category 13 | 391632 | 195816 (4 layers, 256QAM) 97896 (2 layers, 256QAM) | 3654144 | 2 or 4 |
| DL Category 14 | 3916560 | 391656 (8 layers, 256QAM) | 47431680 | 8 |
| DL Category 15 | 749856-807744 (Note 3) | 149776 (4 layers, 64QAM) 195816 (4 layers, 256QAM), if alternativeTBS-Index-r14 is not supported) 201936 (4 layers, 256QAM, if alternativeTBS-Index-r14 is supported) 75376 (2 layers, 64QAM) 97896 (2 layers, 256QAM), if alternativeTBS-Index-r14 is not supported) 100752 (2 layers, 256QAM, if alternativeTBS-Index-r14 is supported) | 9744384 | 2 or 4 |
| DL Category 16 | 978960-1051360 (Note 3) | 149776 (4 layers, 64QAM) 195816 (4 layers, 256QAM), if alternativeTBS-Index-r14 is not supported) 201936 (4 layers, 256QAM, if alternativeTBS-Index-r14 is supported) 75376 (2 layers, 64QAM) 97896 (2 layers, 256QAM), if alternativeTBS-Index-r14 is not supported) 100752 (2 layers, 256QAM, if alternativeTBS-Index-r14 is supported) | 12789504 | 2 or 4 |
| DL Category 17 | 25065984 | 391656 (8 layers, 256QAM) | 303562752 | 8 |
| DL Category 18 | 1174752-1211616 (Note 3) | [299856 (8 layers, 64QAM) 391656 (8 layers, 256QAM)] 149776 (4 layers, 64QAM) 195816 (4 layers, 256QAM), if alternativeTBS-Index-r14 is not supported) 201936 (4 layers, 256QAM, if alternativeTBS-Index-r14 is supported) | 14616576 | 2 or 4 [or 8] |

TABLE 4.1A-1-continued

Downlink physical layer parameter values set by the field ue-CategoryDL

| UE DL Category | Maximum number of DL-SCH transport block bits received within a TTI (Note 1) | Maximum number of bits of a DL-SCH transport block received within a TTI | Total number of soft channel bits | Maximum number of supported layers for spatial multi-plexing in DL |
|---|---|---|---|---|
| DL Category 19 | 1566336-1658272 (Note 3) | 75376 (2 layers, 64QAM) 97896 (2 layers, 256QAM), if alternativeTBS-Index-r14 is not supported) 100752 (2 layers, 256QAM, if alternativeTBS-Index-r14 is supported) [299856 (8 layers, 64QAM) 391656 (8 layers, 256QAM)] 149776 (4 layers, 64QAM) 195816 (4 layers, 256QAM), if alternativeTBS-Index-r14 is not supported) 201936 (4 layers, 256QAM, if alternativeTBS-Index-r14 is supported) 75376 (2 layers, 64QAM) 97896 (2 layers, 256QAM), if alternativeTBS-Index-r14 is not supported) 201936 (4 layers, 256QAM, if alternativeTBS-Index-r14 is supported) | 19488768 | 2 or 4 [or 8] |

(Note 1):
In carrier aggregation operation, the DL-SCH processing capability can be shared by the UE with that of MCH received from a serving cell. If the total eNB scheduling for DL-SCH and an MCH in one serving cell at a given TTI is larger than the defined processing capability, the prioritization between DL-SCH and MCH is left up to UE implementation.

(Note 2):
Within one TTI, a UE indicating category 0 shall be able to receive up to 1000 bits for a transport block associated with C-RNTI/Semi-Persistent Scheduling C-RNTI/P-RNTI/SI-RNTI/RA-RNTI and up to 2216 bits for another transport block associated with P-RNTI/SI-RNTI/RA-RNTI.

(Note 3):
The UE indicating category x shall reach the value within the defined range indicated by "Maximum number of DL-SCH transport block bits received within a TTI" of category x. The UE shall determine the required value within the defined range indicated by "Maximum number of DL-SCH transport block bits received within a TTI" of the corresponding category, based on its capabilities (i.e., CA band combination, MIMO, Modulation scheme). If the UE capability of CA band combination, MIMO and modulation scheme supported can exceed the upper limit of the defined range, the UE shall support the maximum value of the defined range indicated by "Maximum number of DL-SCH transport block bits received within a TTI" of the corresponding category.

The supported data rate is given in the table as the maximum number of transport blocks that can be transmitted in one transmission frame, see column 2 of the table. From this it can be seen that the data rate delivered increases with the mobile radio device category number. The lowest data rate is supplied in mobile radio device category 1, and the highest data rate in mobile radio device category 12.

The second table below shows the different mobile radio device categories for the uplink section. This table was also taken from the 3GPP specification 3GPP TS 36.606 V14.0.0 (2016-09).

TABLE 4.1A-2

Uplink physical layer parameter values set by the field ue-CategoryUL

| UE UL Category | Maximum number of UL-SCH transport block bits transmitted within a TTI | Maximum number of bits of an UL-SCH transport block transmitted within a TTI | Support for 64QAM in UL | Support for 256QAM in UL |
|---|---|---|---|---|
| UL Category M1 (Note 1) | 1000 or 2984 | 1000 or 2984 | No | No |
| UL Category M2 | 6968 | 6968 | No | No |
| UL Category 0 | 1000 | 1000 | No | No |
| UL Category 1bis | 5160 | 5160 | No | No |
| UL Category 3 | 51024 | 51024 | No | No |
| UL Category 5 | 75376 | 75376 | Yes | No |
| UL Category 7 | 102048 | 51024 | No | No |
| UL Category 8 | 1497760 | 149776 | Yes | No |
| UL Category 13 | 150752 | 75376 | Yes | No |
| UL Category 14 | 9585664 | 149776 | Yes | No |
| UL Category 15 | 226128 | 75376 | Yes | No |
| UL Category 16 | 105528 | 105528 | Yes | Yes |
| UL Category 17 | 2119360 | 211936 | Yes | Yes |
| UL Category 18 | 211056 | 105528 | Yes | Yes |
| UL Category 19 | 13563904 | 211936 | Yes | Yes |

TABLE 4.1A-2-continued

Uplink physical layer parameter values set by the field ue-CategoryUL

| UE UL Category | Maximum number of UL-SCH transport block bits transmitted within a TTI | Maximum number of bits of an UL-SCH transport block transmitted within a TTI | Support for 64QAM in UL | Support for 256QAM in UL |
|---|---|---|---|---|
| UL Category 20 | 316584 | 105528 | Yes | Yes |
| UL Category 21 | 301504 | 75376 | Yes | No |

(Note 1):
The UE supports "Maximum number of UL-SCH transport block bits transmitted within a TTI" and "Maximum number of bits of an UL-SCH transport block transmitted within a TTI" of 2984 bits if the UE indicates support of ce-pusch-nb-maxTbs-r14. Otherwise the UE supports 1000 bits.

Here, it is also the case that the lowest data rate is supplied in mobile radio device category 1 and the highest data rate in the case of a mobile radio device category 12, see column 2. To consume as little energy as possible, it is beneficial if the communication module 110 in the parked transportation vehicle 30 is operated with the lowest mobile radio device category. In accordance with both tables this is the mobile radio device category "Category M1". This category was specifically designed for the automated machine to machine communication (MTC=Machine Type Communication). For a parked transportation vehicle with a stopped engine this category would be suitable if the aim is to achieve the lowest energy consumption.

If, on the other hand, the transportation vehicle is operated with the engine running and is moving, the aim in this case is to provide the best supply of data to the transportation vehicle and a high data rate is desired. In the example of FIG. 1 this applies to the transportation vehicle 32. Transportation vehicle 32 is therefore operated in a mobile radio device category of category 6 or above in accordance with Table 1.

In these device classes, the focus is on their function as a mobile terminal device. Here, the main aim is the transmission of data at high speed (MBB=mobile broadband), wherein the energy consumption of the terminal is a secondary issue.

The transportation vehicle 31 represents a special case, in that while it is also parked, it is nevertheless being operated as a radio relay station. It is thus used to forward the data coming into/going out of the transportation vehicle 30. As long as it fulfils this function it should also be operated in the device category of category 6 or above in accordance with Table 1. The transportation vehicle 31 is not operated permanently as a radio relay station, to conserve its battery.

In the following a method is described with which a change of the mobile radio device category for the various operating states of the transportation vehicles can be implemented.

Figure 4:
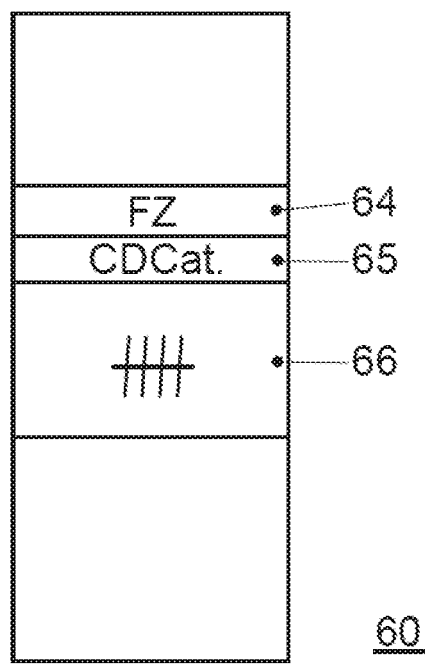
FIG. 4 shows the register locations and a table in a memory assigned to the mobile radio station.

In the memory 60 of the infotainment system 200, specific areas are reserved for this which support the change of the mobile radio device category. In FIG. 4, two register locations 64, 65 in a registration area of the memory 60 are highlighted. For this purpose, the memory 60 may be designed as a non-volatile memory, for example, CMOS-RAM or EEPROM or FEPROM. The register location 64 is used to reflect the current operating state of the transportation vehicle. The register location 64 is set whenever the operating state changes. Hence if the transportation vehicle is parked, then by switching off the engine a program routine is executed in the computing unit 40, for example, triggered by interrupt, which resets the register location 64. If the operating state "Engine On" was previously entered at this location, then the new operating state "Engine Off" is entered. Other operating states can thus be entered at this register location 64. As another example, the operating state "Relay" is given, in which, for example, the transportation vehicle 31 is operated.

The purpose of the second register location 65 is to reflect the current mobile radio device category with which the transportation vehicle is registered on the mobile radio network. It is reset every time in a program routine, to be explained below. The reference number 66 designates another assignment table, which specifies which mobile radio device category is allocated for which operating state.

Figure 5:
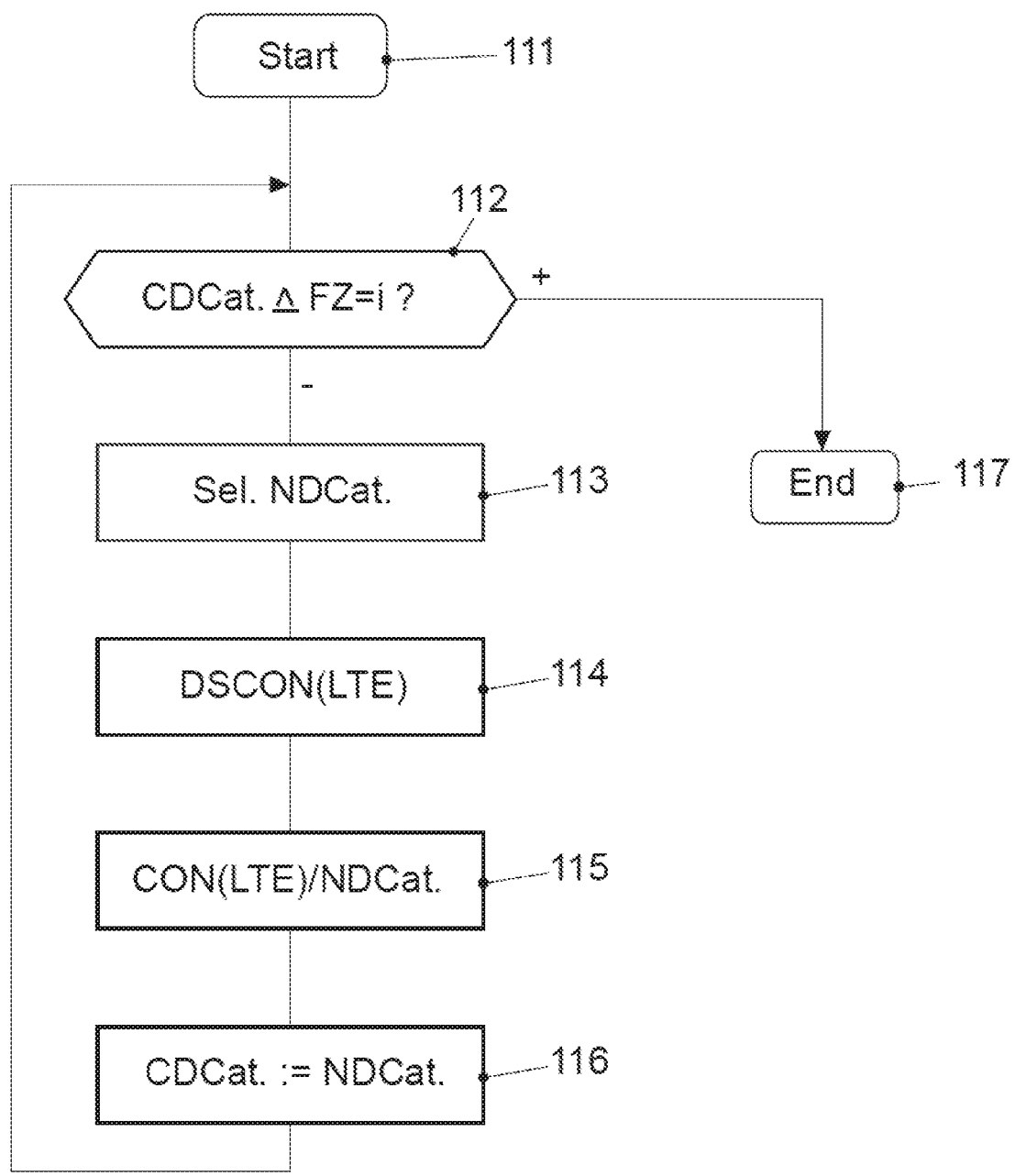
FIG. 5 shows a flowchart of a program with which the mobile radio device category is set according to the state of a transportation vehicle.

The program routine to set the register location 65 is repeated frequently during the operation of the transportation vehicle. It is called up, for example, every 1 to 30 seconds. This program routine is also processed in the computing unit 40. The flow diagram of this program routine is shown in FIG. 5. The reference numeral 111 designates the program start. This is followed in query 112 by the examination of whether the currently registered mobile radio device category CDCat. still corresponds to the current operating state of the transportation vehicle FZ. To do this, the current operating state is read out of the register location 64 and the registered mobile radio device category is read out of the register location 65. To determine whether both entries correspond, Table 66 is used to look up which mobile radio device category is allocated for the current operating state. It should be noted that it can be very useful if one and the same mobile radio device category is allocated for a plurality of operating modes. It may be equally useful if a plurality of mobile radio device categories is entered for one operating state in the chart.

If in query 112 it is found that for the current operating state the transportation vehicle is registered with a permissible mobile radio device category CDCat. according to Table 66, then the program ends in operation at 117. Otherwise, the selection of a permissible mobile radio device category is performed using the assignment table 66 in operation at 113. The new selection is recorded in the variable NDCat. In the next operation at 114, the transportation vehicle, in other words the communication module 110 of the transportation vehicle, is de-registered from the mobile radio system. In LTE the so-called RRC procedures, standing for radio resource control, are provided for the registration and de-registration in the network. During de-registration, the RRC connection release procedure is carried out. There is an RRC specification in which the details of this procedure are described. In this respect, reference is made to the ETSI specification ETSI TS 136 331 V13.1.0 (2016-04). The connection release procedure can be found in section 5.3.8. The de-registration is carried out for the current connection and thus for the device category CDCat. that was registered when setting up the connection.

Then, a new registration procedure is executed in operation at 115. According to the standard, it is the RRC Connection Establishment Procedure. This procedure is described in Chapter 5.3.3 of the ETSI specification TS 136 331. In this, after a request by the base station 20, the mobile radio station which is registering sends back a UE capability message, indicating that it is registering with the newly selected mobile radio device category NDCat. The UE capability message is transmitted in the logical LTE channel UL-DCCH, standing for Dedicated Control Channel for the uplink transmission direction. The base station 20 then sets up the appropriate service to match the registered device category NDCat.

In operation at 116, the register location 64 is updated in the memory 60. The new device category NDCat. is registered at this register location.

It should be understood that the proposed method and the associated devices can be implemented in various forms of hardware, software, firmware, special processors or a combination of these. Special processors can comprise application specific integrated circuits (ASICs), Reduced Instruction Set Computers (RISC) and/or Field Programmable Gate Arrays (FPGAs). Optionally, the proposed method and the device are implemented as a combination of hardware and software. The software may be installed as an application program on a software storage device. Typically, this will be a machine based on a computer platform, which has hardware such as one or more central processing units (CPU), a random-access memory (RAM) and one or more of the input/output (I/O) interface(s). In addition, an operating system is typically installed on the computer platform. The various processes and functions which have been described here can either be part of the application program, or executed as part of the operating system.

The disclosure is not limited to the exemplary embodiments described here. There is scope for various adaptations and modifications, which the person skilled in the art due to his expertise would also consider as belonging to the disclosure.

Instead of the registration and de-registration of a device category with each state change, a new mobile radio device category could be introduced for transportation vehicle communications devices. A communication device with this new device category could register once on the mobile radio network, to then signal the communication properties within the connection, such as low or high data rate according to the transportation vehicle states. This might be performed under the RRC Connection Reconfiguration procedure provided in the standard, described in Chapter 5.3.5. However, it would be necessary to specify the new device category.

This alternative provides the possibility of also transmitting the special characteristics of transportation vehicle terminal device (for example, enhanced speed profile, special features of the antenna arrangement, enhanced power output profile) to the network.

The exemplary embodiments have been described for the transportation vehicle sector. It is pointed out, however, that the disclosed embodiments can also be used in other sectors as well. Thus, it would be possible to also use the disclosed embodiments in other mobile radio devices, such as smart phones or tablets. A change in operating state is also common in these devices. The operating states Power On and Standby will be mentioned, for which various device categories could also be registered. Other states are Audio or Video Streaming, Software Update and Mobile Data On/Off.

The execution of the program routine can also be carried out by the communication module itself. It does not have to be performed in an external processing unit. Also, the associated memory can be provided internally in the communication module.

LIST OF REFERENCE NUMERALS

10 internet
20 base station
30 parked transportation vehicle
31 parked transportation vehicle with relay function
32 transportation vehicle in motion
40 processing Unit
50 input unit
52 touch-sensitive display unit
54 head-up display
60 storage unit
64 transportation vehicle state register location
65 registered device category register location
66 assignment table
70 data cable to the display unit
80 data cable to storage unit
90 data cable to the input unit
100 data bus
110 communication module
111 programming block
112 testing current device category and transportation vehicle state
113 selection of the matching device category
114 de-registration from the mobile radio
115 registration on the mobile radio with new device category
116 definition of current device category
120 telephone
130 navigation device
140 radio
150 camera
160 instrument cluster
200 infotainment system

The invention claimed is:

1. A mobile radio station included in a mobile radio system, the mobile radio station comprising:
   at least one processor running software; and
   a memory accessible by the software,
   wherein the mobile radio station is installed in a transportation vehicle and the mobile radio station includes one or more operating states that relate to an operating state of the transportation vehicle, wherein the operating states of the transportation vehicle can include an Engine On, Engine Off, and "Relay" state,
   wherein, when the operating state of the transportation vehicle is one of Engine On, Engine Off, and "Relay" and the transportation vehicle is parked, the mobile radio station is operated as a radio relay station,
   wherein a plurality of mobile radio device categories are defined in the mobile radio system,
   wherein, a mobile radio device category is assigned to the mobile radio station and is stored in a table in the memory,
   wherein the assigned mobile radio device category is registered on the mobile radio station to communicate in the mobile radio system, wherein the registration specifies the assigned mobile radio device category for the mobile radio device,
   wherein the mobile radio station monitors the operating state of the mobile radio station to determine whether a current operating state of the transportation vehicle has changed and, during operation, the mobile radio station determines-whether the assigned mobile radio device category matches the current operating state of the mobile radio station that relates to the operating state of the transportation vehicle, wherein the mobile radio station is logged out of the mobile radio base station in response to a difference between the assigned-mobile radio device category and the current operating state of the mobile radio station that relates to the operating state of the transportation vehicle, wherein the mobile radio station is, thereafter, re-registered on the mobile radio base station in the mobile radio system with specification of a second assigned mobile radio device category, and wherein the memory further includes a register location in a register area, wherein the current operating state of the mobile radio station that relates to the operating state of the transportation vehicle is registered in an entry in the register location, and wherein the entry is updated in response to detection of a change of operating state of the transportation vehicle.

2. The mobile radio station of claim 1, wherein the memory also includes a second register location in the registration area, and wherein the current mobile radio device category is registered in an entry in the second register location.

3. The mobile radio station of claim 1, wherein the check as to whether the assigned mobile radio device category still matches the current operating state of the transportation vehicle is carried out in response to detection of the change of operating state of the transportation vehicle.

4. The mobile radio station of claim 1, wherein the check as to whether the assigned device category still matches the change of operating state of the transportation vehicle is carried out continuously in operation, repeated intermittently, or repeated with a specific time interval.

5. The mobile radio station of claim 2, wherein the entry in the second register location is updated in the process of de-registration and re-registration of the mobile radio station on the mobile radio base station.

6. The mobile radio station of claim 1, wherein at least the operating states "Engine On" and "Standby" are distinguished for the registration, wherein a variation of the 3GPP LTE mobile radio standard family is used as the mobile radio system, and wherein a mobile radio device category of "Category 6" or above, corresponding to "mobile broad band MBB", is provided for the "Engine On" operating state, and wherein a mobile radio device category with inferior transmission properties than "Category 6" is provided for the "Standby" operating state of the transportation vehicle.

7. The mobile radio station of claim 1, wherein a variation of the 3GPP mobile radio standard family is used as the mobile radio system, and wherein the mobile radio device category "Category M1" corresponding to "machine type communication MTC" is provided for the "Engine Off" operating state, and wherein a mobile radio device category of "Category 6" or above, corresponding to "mobile broad band MBB", is provided for the operating states "Engine On" and "Relay".

8. The mobile radio station of claim 1, wherein the assignment of one or more operating states to a mobile radio device category is extracted from the table in the memory of the mobile radio station.

9. A method for operating a mobile radio station in a mobile radio system, the method comprising:

providing a memory accessible by software included in the mobile radio station, defining a number of mobile radio device categories in the mobile radio system, registering the mobile radio station on a mobile radio base station for communication in the mobile radio system the registration specifying mobile radio device category that is assigned to the mobile radio station, installing the mobile radio station in a transportation vehicle, the transportation vehicle including a number of operating states including Engine On, Engine Off, and Relay, and the mobile radio station including a number of operating states that correspond to the operating state of the transportation vehicle, monitoring the mobile radio station to determine whether the operating state of the transportation vehicle changes, checking, during operation, whether the mobile radio device category assigned to the mobile radio station matches the current operating state of the transportation vehicle, logging the mobile radio station out of the mobile radio base station if the mobile radio device category assigned to the mobile radio station does not match the current operating state of the vehicle, re-registering the mobile radio station on the mobile radio base station by specifying a second mobile radio device category, registering the current operating state of the transportation vehicle in an entry in a register location in a register area of the memory, wherein the entry is updated in response to detection of a change of operating state of the transportation vehicle, distinguishing at least the operating states "Engine On" and "Engine Off" during the registering, installing and checking steps, and distinguishing at least the operating state "Relay", in which the parked transportation vehicle is operated as a mobile radio relay station, as an additional operating state for the registering, installing and checking steps.

10. The method of claim 9, wherein the step of checking as to whether the assigned mobile radio device category matches the current operating state is carried out in response to detection of the change of operating state.

11. The method of claim 9, wherein the step of checking as to whether the assigned device category matches the current operating state is carried out continuously in operation or repeated intermittently or repeated with a specific time interval.

12. The method of claim 10, wherein an entry in a second register location in the register area of the memory where the mobile radio device category is registered is updated in the process of de-registration and re-registration of the mobile radio station on the mobile radio base station.

13. The method of claim 9, wherein at least the operating states "Engine On" and "Standby" are distinguished for the registration, wherein a variation of the 3GPP LTE mobile radio standard family is used as the mobile radio system, and wherein a mobile radio device category of "Category 6" or above, corresponding to "mobile broad band MBB", is provided for the "Engine On" operating state, and wherein a mobile radio device category with inferior transmission properties than "Category 6" is provided for the "Standby" operating state of the transportation vehicle.

14. The method of claim 9, wherein a variation of the 3GPP mobile radio standard family is used as the mobile radio system, and wherein the mobile radio device category "Category M1" corresponding to "machine type communication MTC" is provided for the "Engine Off" operating state, and wherein a mobile radio device category of "Category 6" or above, corresponding to "mobile broad band MBB", is provided for the operating states "Engine On" and "Relay".

15. The method of claim 9, wherein the assignment of one or more operating states to a mobile radio device category is extracted from a table in the memory assigned to the mobile radio station.

16. A non-transitory computer readable medium comprising program operations which carry out a method for operating a mobile radio station installed in a transportation vehicle during execution of the non-transitory computer readable medium-in a processing unit, the method comprising:
   accessing a memory by software included in the mobile radio station,
   identifying a number of mobile radio device categories in a mobile radio system that includes the mobile radio station,
   registering the mobile radio station on a mobile radio base station for communication in the mobile radio system, the registration specifying an assigned mobile radio device category that is assigned to the mobile radio station,
   registering a first operating state of the mobile radio station in an entry in a register location in a register area of the memory, where the first operating state of the mobile radio station corresponds to a current operating state of the transportation vehicle selected from number of operating states of the transportation vehicle, including Engine On, Engine Off, and Relay,
   monitoring the operating state of the mobile radio station to determine whether the operating state of the transportation vehicle changes,
   checking, during operation, whether the assigned mobile radio device category matches the current operating state of the mobile radio station,
   logging the mobile radio station out of the mobile radio base station if the assigned mobile radio device category does not match the current operating state of the mobile radio station,
   re-registering the mobile radio station on the mobile radio base station by specifying a second assigned mobile radio device category,
   registering a second current operating state of the mobile radio station-in the entry in the register location in the register area of the memory, wherein the entry is updated in response to detection of a change of operating state of the transportation vehicle,
   distinguishing at least the operating states "Engine On" and "Engine Off" during the registering, re-registering and checking steps, and
   distinguishing at least the operating state "Relay", in which the parked transportation vehicle is operated as a mobile radio relay station, registering, re-registering and checking steps.

17. The non-transitory computer readable medium-of claim 16, wherein the step of checking as to whether the assigned mobile radio device category matches the current operating state is carried out in response to detection of the change of operating state.

18. The non-transitory computer readable medium of claim 16, wherein the step of checking as to whether the assigned device category matches the current operating state is carried out continuously in operation or repeated intermittently or repeated with a specific time interval.

19. The non-transitory computer readable medium of claim 16, wherein an entry in a second register location in the register area of the memory where the mobile radio device category is registered is updated in the process of de-registration and re-registration of the mobile radio station on the mobile radio base station.

20. The non-transitory computer readable medium of claim 16, wherein at least the operating states "Engine On" and "Standby" are distinguished for the registration, wherein a variation of the 3GPP LTE mobile radio standard family is used as the mobile radio system, and wherein a mobile radio device category of "Category 6" or above, corresponding to "mobile broad band MBB", is provided for the "Engine On" operating state, and wherein a mobile radio device category with inferior transmission properties than "Category 6" is provided for the "Standby" operating state of the transportation vehicle.

21. The non-transitory computer readable medium of claim 16, wherein a variation of the 3GPP mobile radio standard family is used as the mobile radio system, and wherein the mobile radio device category "Category M1" corresponding to "machine type communication MTC" is provided for the "Engine Off" operating state, and wherein a mobile radio device category of "Category 6" or above, corresponding to "mobile broad band MBB", is provided for the operating states "Engine On" and "Relay".

22. The non-transitory computer readable medium of claim 16, wherein the assignment of one or more operating states to a mobile radio device category is extracted from a table in the memory assigned to the mobile radio station.

23. A mobile radio system including a mobile radio station in a transportation vehicle, the mobile radio system comprising:
   a mobile radio station with at least one processor running software; and
   a memory accessible by the software,
   wherein the mobile radio system is configured to:
   define a number of mobile radio device categories in the mobile radio system,
   register the mobile radio station on a mobile radio base station for communication in the mobile radio system, the registration specifying an assigned mobile radio device category that is assigned to the mobile radio station,
   include a number of operating states in the mobile radio station that correspond to one of a number of operating states of the transportation vehicle including Engine On, Engine Off, and Relay;
   monitor the mobile radio station to determine whether the operating state of the transportation vehicle changes,
   check, during operation, whether the assigned mobile radio device category matches the current operating state of the transportation vehicle,
   log the mobile radio station out of the mobile radio base station if the assigned mobile radio device category does not match the current operating state of the vehicle,
   re-register the mobile radio station on the mobile radio base station with specification of a second mobile radio device category,
   register the current operating state of the transportation vehicle in an entry in a register location in a register area of the memory, wherein the entry is updated in response to detection of a change of operating state of the transportation vehicle, distinguish at least the operating states "Engine On" and "Engine Off" during the registering and checking steps, and distinguish at least the operating state "Relay", in which the parked transportation vehicle is operated as a mobile radio relay station, as an additional operating state for the registering and checking steps.

* * * * *